United States Patent [19]

Kent, Jr.

[11] 4,268,652
[45] May 19, 1981

[54] COLOR STYRENE-ACRYLONITRILE POLYMERS

[75] Inventor: Raymond W. Kent, Jr., Midland, Mich.

[73] Assignee: The Dow Chemical Company, Midland, Mich.

[21] Appl. No.: 112,574

[22] Filed: Jan. 16, 1980

[51] Int. Cl.³ .......................................... C08F 212/10
[52] U.S. Cl. ................................... 526/217; 526/218; 526/342
[58] Field of Search ..................... 526/217, 218, 342

[56] References Cited

U.S. PATENT DOCUMENTS

| | | | |
|---|---|---|---|
| 3,891,609 | 6/1975 | Wolfe et al. | 526/342 |
| 3,931,143 | 1/1976 | MacLeay et al. | 526/218 |

Primary Examiner—Harry Wong, Jr.

[57] ABSTRACT

A process for reducing the color of styrene-acrylonitrile polymers comprising polymerizing a feedstream of styrene and acrylonitrile monomers, optionally admixed with a diluent, in the presence of an unsymmetrical tertiary-aliphatic-alpha-cyano-azoalkane catalyst, said feedstream being substantially oxygen-free and said feedstream being maintained within a polymerization zone for a limited time.

15 Claims, No Drawings

COLOR STYRENE-ACRYLONITRILE POLYMERS

BACKGROUND OF THE INVENTION

This invention relates to a process for producing styrene and acrylonitrile polymers having reduced (or low) color.

Styrene and acrylonitrile polymers have found wide acceptance and are used for many applications wherein it is desired to have a colorless or generally colorless polymer. Styrene and acrylonitrile polymers have a natural tendency to assume a yellowish cast as conventionally manufactured. A particularly desirable method for the manufacture of styrene and acrylonitrile containing polymers is by the so-called recirculating coil process such as is described in U.S. Pat. Nos. 2,769,804 to A. W. Hanson and 2,989,517 to A. W. Hanson et al., the teachings of which are herewith incorporated by reference thereto. For many applications, depending upon the color of the article desired, a slight yellowish cast in the unfilled and unpigmented polymer is of little or no significance. However, for many applications it is desirable that the styrene and acrylonitrile polymer be generally colorless as a polymer having a yellow cast may require individual color matching of polymer if the yellow cast varies from batch to batch.

It is known from application Ser. No. 051,940, filed June 25, 1979, that styrene-acrylonitrile polymers having a reduced or lower level of color may be produced by a recirculating coil process, with or without a free radical initiator such as 1,1-ditertiary-butyl peroxycyclohexane, wherein the level of oxygen in feed to the polymerization zone is less than 20 parts by weight per million parts by weight of the polymerizing mass.

It is known from Japanese application (Kokai) No. 48-079,89-Q, published on Jan. 13, 1973, that a combination of symmetrical azo compounds, such as 2,2'-azo-bis-isobutyronitrile, and peroxy compounds, such as tertiary-butyl peracetate, may be used as catalysts in the polymerization of styrene-acrylonitrile copolymers in conjunction with specified temperature ranges and specified time periods, which, in total, exceed five hours, to allegedly yield "color free styrene-acrylonitrile copolymers."

It is known from Japanese application (Kokai) No. 48-031,285, published on Apr. 24, 1973, that small amounts of 2,2'-azo-bis-2,4-dimethylvaleronitrile may be used as a catalyst in a two-stage polymerization process, bulk polymerization followed by suspension polymerization, for the polymerization of styrene-acrylonitrile copolymers having the properties of being chemical resistant and allegedly being "color free." The process specifies temperatures of 100° C. or less and time spans in excess of three hours.

It is known from Japanese application No. 49-026,076, examined and published on May 22, 1974, that copolymers of alpha-methylstyrene, acrylonitrile and styrene may be prepared by using a combination of azo-bis-cyclohexanenitrile and dicumyl peroxide and/or ditertiary-butyl peroxide as catalysts in the bulk or suspension polymerization of monomer mixtures of alpha-methylstyrene, acrylonitrile, and styrene at temperatures of 100° centigrade (hereinafter "C") or less and for time periods of about 20 hours. The reference concerns physical properties other than color.

It is known from Takizawa et al. (U.S. Pat. No. 3,931,128) that copolymers of acrylonitrile and an aromatic vinyl compound such as styrene having some yellow coloration are prepared using a combination of a symmetrical azo-type catalyst and an organic peroxide catalyst free from a benzene ring as the free radical initiator in a two-level (temperature-based) polymerization process which involves time spans in excess of five hours.

It is known from Ott et al. (U.S. Pat. No. 3,629,370) that graft copolymers of a diene polymer, such as butadiene, as a base, a styrene-type monomer, and an acrylonitrile-type monomer are prepared using a water-soluble symmetrical aliphatic azo-group containing compound as a catalyst. These graft copolymers were prepared to emphasize physical properties other than color.

It is known from MacLeay et al. (U.S. Pat. No. 4,009,157) that primary aliphatic-alpha-hydroxyazolkanes, such as 1-methylazo-1-hydroxycyclohexane, may be used as foaming agents for polyester resins and initiators for free radical polymerization of vinyl monomers. The primary aliphatic-alpha-hydroxyazoalkanes are said to be more stable than the tertiary-aliphatic-alpha-hydroxyazoalkanes.

It is known from MacLeay et al. (U.S. Pat. No. 3,931,143) that unsymmetrical tertiary-aliphatic-alpha-cyano-azoalkanes such as 1-tertiary-butylazo-1-cyanocyclohexane may be used as the initiator in the polymerization of monomers such as styrene and acrylonitrile.

It is known from MacLeay et al. (U.S. Pat. No. 4,048,423) that unsymmetrical tertiary-aliphatic azoalkanes, which are characterized by having a tertiary carbon atom joined to one of the azo nitrogens, may be used as the vinyl polymerization initiator.

It would be desirable if there were available an improved method for the free radical-initiated preparation of a styrene and acrylonitrile containing polymer which could be considered to have, in general, a very low color content.

It would also be desirable to provide improved styrene-acrylonitrile polymers which exhibit a reduced tendency to form a yellow cast during manufacture thereof.

These benefits and other advantages in accordance with the present invention are achieved in a process for the mass polymerization of a feedstream, said feedstream comprising a monomer composition of from about 20 to about 80 parts by weight of acrylonitrile and from about 80 to about 20 parts by weight of styrene and from about 0 to about 30 parts by weight of a diluent which serves as a solvent for styrene and acrylonitrile monomers and as a diluent for a styrene and acrylonitrile containing polymer, said feedstream thereafter being passed into a polymerization zone wherein the feedstream is maintained at a temperature of from about 120° C. to about 170° C. under a pressure of from about 10 to about 300 pounds per square inch (hereinafter "psi") whereby at least a portion of the feedstream is thereafter subjected to heat and vacuum sufficient to remove at least a major portion of any residual unpolymerized components of the feedstream including the diluent, the improvement being the incorporation within the feedstream, as a polymerization initiator, from about 80 to about 700 parts per million parts by weight of the feedstream of an unsymmetrical tertiary-aliphatic-alpha-cyano-azoalkane, the attaining and maintaining of a level of oxygen within the feedstream as it is passed into the polymerization zone, while said feedstream is being polymerized, of not greater than about 20 parts by weight per million parts by weight of the feedstream, and the residence time of the feedstream within the polymerization zone being from about 0.7 to about 1.4 hours.

The styrene component is preferably of commercial purity and is present in an amount of from about 80 to about 20 parts by weight.

The acrylonitrile is preferably of commercial purity and is present in an amount of from about 20 to about 80 parts by weight.

The diluent is advantageously a solvent in which the styrene and acrylonitrile monomers are soluble. More advantageously, the diluent is selected from the group consisting of ethylbenzene and N,N-dimethylformamide in an amount of from about 0 to about 30 parts by weight, based upon the total weight of the feedstream. Beneficially, the diluent is selected from the group consisting of ethylbenzene and N,N-dimethylformamide in an amount of from about 15 to about 25 parts by weight, based upon the total weight of the feedstream. Preferably, the diluent consists of from about 15 to 25 parts by weight, based upon the total weight of the feedstream of ethylbenzene.

The free radical polymerization initiator is advantageously about 80 to about 700 parts per million parts by weight of the feedstream of an unsymmetrical tertiary-aliphatic-alpha-cyano-azoalkane of the formula

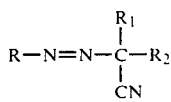

wherein R is a tertiary-butyl or a tertiary-pentyl radical, $R_1$ is a methyl radical, $R_2$ is an alkyl or an alkoxy radical containing six carbon atoms, and $R_1$ and $R_2$ when considered collectively are part of a single, straight-chain pentenylene moiety. Beneficially, the free radical polymerization initiator is from about 80 to about 700 parts per million parts by weight of the feedstream of one of the following: 1-tertiary-butylazo-1-cyanocyclohexane, 1-tertiary-amylazo-1-cyanocyclohexane, 2-tertiary-butylazo-2-cyanobutane and 2-tertiary-butylazo-2-cyanopropane. Preferably, the free radical polymerization initiator is from about 200 to about 500 parts per million parts by weight of the feedstream of one of the following: 1-tertiary-butylazo-1-cyanocyclohexane, 1-tertiary-amylazo-1-cyanocyclohexane, 2-tertiary-butylazo-2-cyanobutane and 2-tertiary-butylazo-2-cyanopropane. Most preferably, the free radical polymerization initiator is from about 200 to about 500 parts per million parts by weight of the feedstream of 1-tertiary-butylazo-1-cyanocyclohexane. The preferred free radical polymerization initiators may be prepared in accordance with MacLeay et al. (U.S. Pat. No. 3,931,143), the teachings of which are incorporated by reference thereto.

The feedstream consists preferably of from about 80 to about 20 parts by weight of styrene, from about 20 to about 80 parts by weight of acrylonitrile, and from about 0 to about 30 parts by weight of a diluent such as ethylbenzene. It is essential and critical to the practice of the present invention and to the obtaining of polymers having a minimum yellow cast that the oxygen level in the feedstream not be greater than about 20 parts by weight per million parts by weight of the feedstream. Most preferably, the total molecular oxygen concentration should be maintained below about 5 parts by weight per million parts by weight of the feedstream.

While one may either deoxygenate the components of the feedstream prior to mixing or deoxygenate the feedstream after mixing the components, the preferred practice of the present invention is to deoxygenate the styrene monomer and the acrylonitrile monomer before mixing, with or without a solvent such as ethylbenzene or N,N-dimethylformamide, with or without a dissolved rubber therein. Various methods may be employed to remove oxygen from these components. One method is by spraying the feedstream containing a solvent or diluent into a vacuum chamber and repeating the operation until the desired level of oxygen has been obtained. Another method is to sparge a body of either the individual feedstream components or a combined feedstream with nitrogen until the desired oxygen level has been obtained. Alternately, the feed to a first polymerization zone may be sparged with nitrogen and subsequently passed through a vacuum chamber to remove oxygen. The particular method employed in general will be dependent on the facilities available. In the preparation of a styrene and acrylonitrile containing polymer such as a polymer of about 75 parts by weight styrene and 25 parts by weight acrylonitrile, employing a simple recirculating coil such as described in U.S. Pat. No. 2,769,804, wherein the effluent from the coil is heated and passed through a falling stream devolatilizer, it was observed that the partial polymer sampled before entering the devolatilizer showed much less of a yellow cast than the polymer which had passed through the devolatilizer when about 45 parts per million parts by weight of oxygen were present in the monomer feed to the polymerizing mass. The process of the present invention is operable for the preparation of polymers wherein the styrene content varies from about 20 to 80 parts by weight and the acrylonitrile content from about 80 to 20 parts by weight.

In practicing the process of this invention, one may use a recirculating coil apparatus, a recirculating tube train apparatus or a boiling reactor. The polymerization initiator is added to the feedstream after mixing and deoxygenation and prior to being passed into a polymerization zone. Advantageously, the feedstream is subjected to temperatures of from about 120° C. to about 170° C. and to pressures of from about 10 to about 300 psi. Preferably, the feedstream is subjected to temperatures of from about 135° C. to about 155° C. and to pressures of from about 100 to about 200 psi for the recirculating coil apparatus and the recirculating tube train apparatus or from about 10 to about 60 psi for the boiling reactor. At temperatures in excess of about 170° C., cooling of the reactor becomes very difficult. At temperatures below about 120° C., the polymerization rate is too low for the purposes of commercial or practical application, thereby necessitating an increase in the amount of time which the feedstream must remain within the polymerization zone which in turn may lead to undesirable products, some of which may have excessive molecular weights. In addition, when using either the recirculating coil apparatus or the recirculating tube train apparatus, the pressures must be maintained above the vapor pressure of the component with the lowest boiling point in order to prevent polymerization within the vapor phase, but below the preferred maximum of about 300 psi as pressures in excess of about 300 psi may cause structural changes in the polymer which may cause the process to become uneconomical.

When using the boiling reactor, the rate of reaction within the boiling reactor will be difficult to control at pressures in excess of 60 psi. At pressures of less than 10 psi, the process would be uneconomical for commercial or practical purposes as it would lead either to excessive molecular weight polymers or to the use of uneconomical amounts of additives such as catalysts and chain-transfer agents.

The rate of feed into a polymerization vessel is determined by the length of residence time of the feedstream in the polymerization zone within the polymerization vessel which in turn is determined by the portion of the feedstream which is to be polymerized. The residence time is preferably from about 0.7 to about 1.4 hours. Most preferably, the residence time is from about 0.9 to about 1.1 hours. If a residence time of less than about 0.7 hour is selected, the heat of reaction under the preferred range of operating conditions would be too great and would require too much diluent to control the reaction thereby making the process uneconomical. If a residence time in excess of 1.4 hours is selected, the color is detrimentally affected and the process becomes uneconomical.

The product of the polymerization process is subjected to heat and vacuum sufficient to remove at least a major portion of any residual unpolymerized components of the feedstream, such as the diluent, the styrene and acrylonitrile monomers, and the polymerization initiator.

The following examples illustrate the improvements which result from the process of this invention but are not in limitation thereof.

By way of further illustration, a number of continuous polymerizations were conducted utilizing a recirculating coil reactor wherein the feed to the coil was comprised of about 24 weight percent ethylbenzene, the remaining 76 weight percent being a mixture of styrene, acrylonitrile and initiator wherein the ratio of styrene to acrylonitrile was about 75 parts by weight of styrene to about 25 parts by weight of acrylonitrile and wherein the initiator was present in an amount of about 500 parts per million by weight based upon the weight of the polymerizable monomers, said feed being fed to the reactor at a rate of about 1 reactor volume per hour, the material within the coil was recirculated at about 100 reactor volumes per hour to provide a monomer to polymer conversion of about 60 weight percent and the effluent from the reactor was about 55 weight percent solvents. The feed contained either 1-tertiary-butylazo-1-cyanocyclohexane or 1,1-bis-(di-tert-butylperoxy)-cyclohexane as a polymerization initiator. In addition, some of the polymerizations were conducted wherein an effort was made to remove oxygen from the polymerization process by continuously bubbling nitrogen gas through the feed tank, with the remaining polymerizations being conducted without an effort to remove oxygen.

The color was measured by determining the absorbence of polymer solution of 10 grams of polymer in 50 milliliters of methylene chloride at a wavelength of 420 nanometers against a standard of methylene chloride. The polymerizing mixture in the reactor was maintained at a temperature of 145° C. and a pressure of 200 pounds per square inch. The effluent from the reactor was devolatilized at a temperature of about 235° C. under a vacuum of 20 millimeters. The effluent from the reactor was devolatilized to isolate the polymer and reclaim the unreacted monomer and ethylbenzene. The devolatilized polymer was then extruded, cut into granules and dissolved in methylene chloride as stated above. The absorbence data is set forth in Table I below. A lower absorbence equates to lower color.

TABLE I

| Initiator | Absorbence | |
| --- | --- | --- |
| | $O_2$ Present | $N_2$ Purged |
| 1-tert-butylazo-1-cyanocyclohexane | 0.083 | 0.056 |
| 1,1-bis(di-tert-butylperoxy)-cyclohexane | 0.125 | 0.088 |

In a manner similar to the foregoing, comparable results are obtained when 1-tert-butylazo-1-cyanocyclohexane is replaced by 2-tertiary-butylazo-2-cyanobutane or 2-tertiary-butylazo-2-cyanopropane.

In a manner similar to the foregoing, styrene-acrylonitrile copolymers are readily prepared.

The foregoing claims and examples, including the data contained therein support the stated objects for this invention.

What is claimed is:

1. In a process for the mass polymerization of a feedstream, said feedstream comprising a monomer composition of from about 20 to about 80 parts by weight of acrylonitrile, from about 80 to about 20 parts by weight of styrene, and from about 0 to about 30 parts by weight of a diluent, said feedstream thereafter being passed into a polymerization zone wherein the feedstream is maintained at a temperature of from about 120° C. to about 170° C. under a pressure of from about 10 to about 300 psi whereby at least a portion of the feedstream is polymerized to form a polymer, said polymer thereafter being subjected to heat and vacuum sufficient to remove at least a major portion of any residual unpolymerized components of the feedstream and diluent, the improvement being the incorporation within the feedstream, as a polymerization initiator, from about 80 to about 700 parts per million parts by weight of the feedstream of an unsymmetrical tertiary-aliphatic-alpha-cyano-azoalkane, the attaining and maintaining of a level of oxygen within the feedstream as it is passed into the polymerization zone, while said feedstream is being polymerized, of not greater than about 20 parts by weight per million parts by weight of the feedstream, and the residence time of the feedstream within the polymerization zone being from about 0.7 to about 1.4 hours.

2. The process of claim 1 wherein the unsymmetrical tertiary-aliphatic-alpha-cyano-azoalkane is 1-tertiary-butylazo-1-cyanocyclohexane.

3. The process of claim 1 wherein the unsymmetrical tertiary-aliphatic-alpha-cyano-azoalkane is 1-tertiary-amylazo-1-cyanocyclohexane.

4. The process of claim 1 wherein the unsymmetrical tertiary-aliphatic-alpha-cyano-azoalkane has the formula

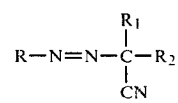

wherein R is a tertiary-butyl or a tertiary-pentyl radical, $R_1$ is a methyl radical, $R_2$ is an alkyl or an alkoxy $C_6$ radical, and $R_1$ and $R_2$ when considered collectively are part of a single, straight-chain pentenylene moiety.

5. The process of claim 1 wherein the unsymmetrical tertiary-aliphatic-alpha-cyano-azoalkane is 2-tertiary-butylazo-2-cyanobutane.

6. The process of claim 1 wherein the unsymmetrical tertiary-aliphatic-alpha-cyano-azoalkane is 2-tertiary-butylazo-2-cyanopropane.

7. The process of claim 1 wherein the unsymmetrical tertiary-aliphatic-alpha-cyano-azoalkane is incorporated into the feedstream in an amount of from about 200 to about 500 parts per million parts based upon the total weight of the feedstream.

8. The process of claim 1 wherein the diluent is ethylbenzene.

9. The process of claim 1 wherein the admixing diluent is N,N-dimethylformamide.

10. The process of claim 1 wherein the monomer composition is an admixture with from about 15 to about 25 parts by weight of a diluent.

11. The process of claim 1 wherein the temperature range is from about 135° C. to about 155° C.

12. The process of claim 1 wherein the pressure range is from about 100 to about 200 psi.

13. The process of claim 1 wherein the residence time within the polymerization zone is from about 0.9 to about 1.2 hours.

14. The process of claim 1 wherein the level of oxygen within the feedstream as it is passed into the polymerization zone, while said feedstream is being polymerized, is not greater than 5 parts by weight per million parts by weight of the feedstream.

15. In a process for the mass polymerization of a feedstream, said feedstream comprising a monomer composition of from about 20 to about 80 parts by weight of acrylonitrile, from about 80 to about 20 parts by weight of styrene, and from about 15 to about 25 parts by weight of ethylbenzene, said feedstream thereafter being passed into a polymerization zone wherein the feedstream is maintained at a temperature of from about 135° C. to about 155° C. under a pressure of from about 100 to about 200 psi whereby at least a portion of the feedstream is polymerized to form a polymer, said polymer thereafter being subjected to heat and vacuum sufficient to remove at least a major portion of any residual unpolymerized components of the feedstream and diluent, the improvement being the incorporation within the feedstream of from about 200 to about 500 parts per million parts by weight of the feedstream of 1-tertiary-butylazo-1-cyanocyclohexane as a polymerization initiator, the attaining and maintaining of a level of oxygen within the feedstream as it is passed into the polymerization zone, while said feedstream is being polymerized, of not greater than about 5 parts by weight per million parts by weight of the feedstream, and the residence time of the feedstream within the polymerization zone being from about 0.9 to about 1.2 hours.

\* \* \* \* \*